(12) United States Patent
Toy

(10) Patent No.: US 10,122,639 B2
(45) Date of Patent: Nov. 6, 2018

(54) SYSTEMS AND METHODS FOR MANAGING A NETWORK

(71) Applicant: Comcast Cable Communications, LLC, Philadelphia, PA (US)

(72) Inventor: Mehmet Toy, Allendale, NJ (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 104 days.

(21) Appl. No.: 14/066,887

(22) Filed: Oct. 30, 2013

(65) Prior Publication Data

US 2015/0117195 A1 Apr. 30, 2015

(51) Int. Cl.
| | |
|---|---|
| H04J 1/16 | (2006.01) |
| H04L 12/825 | (2013.01) |
| H04L 12/801 | (2013.01) |
| H04W 28/02 | (2009.01) |
| H04L 12/841 | (2013.01) |
| H04L 12/26 | (2006.01) |
| H04L 12/46 | (2006.01) |

(52) U.S. Cl.
CPC ........ *H04L 47/283* (2013.01); *H04L 12/4633* (2013.01); *H04L 43/0852* (2013.01); *H04L 43/16* (2013.01); *H04L 47/11* (2013.01); *H04L 47/263* (2013.01); *H04L 43/0858* (2013.01); *H04L 43/0864* (2013.01); *Y02D 50/10* (2018.01)

(58) Field of Classification Search
CPC ... H04N 21/64738; H04L 47/11; H04L 47/12; H04L 47/10; H04W 28/02
USPC .......................................................... 370/229
See application file for complete search history.

(56) References Cited

U.S. PATENT DOCUMENTS

| | | | |
|---|---|---|---|
| 5,313,454 A * | 5/1994 | Bustini et al. ................ 370/231 |
| 5,787,072 A * | 7/1998 | Shimojo ............. H04L 12/5602 |
| | | | 370/231 |
| 6,122,254 A | 9/2000 | Aydemir et al. | |
| 6,577,642 B1 * | 6/2003 | Fijolek ................ H04L 12/2801 |
| | | | 370/465 |
| 7,782,906 B2 | 8/2010 | Zhai | |
| 7,961,621 B2 | 6/2011 | Bergamasco et al. | |
| 8,279,875 B2 | 10/2012 | Zhu et al. | |
| 8,660,075 B2 | 2/2014 | Ghanwani et al. | |
| 9,088,510 B2 | 7/2015 | Li | |

(Continued)

OTHER PUBLICATIONS

Tufail, Muddassir, "Timer Imposed and Priority Supported (TIPS) Congestion Control Scheme for Point-to-Multipoint Connections in ATM", DNAC 96 (13 pages).

(Continued)

*Primary Examiner* — Asad Nawaz
*Assistant Examiner* — Jason Harley
(74) *Attorney, Agent, or Firm* — Ballard Spahr LLP

(57) ABSTRACT

Systems and methods for managing congestion in a network are disclosed. One method can comprise receiving a first congestion indicator at a network point and modifying a data transfer rate to an effective bandwidth in response to receiving the first congestion indicator. If a second congestion indicator is received within a predetermined time period, the data transfer rate can be reduced to a factor of a committed information rate. If a second congestion indicator is not received with the time period, the data transfer rate can be increased to a target transfer rate.

18 Claims, 9 Drawing Sheets

(56) References Cited

U.S. PATENT DOCUMENTS

| | | | |
|---|---|---|---|
| 2002/0023168 A1* | 2/2002 | Bass | H04L 47/20 709/232 |
| 2004/0174815 A1* | 9/2004 | Khisti et al. | 370/235 |
| 2005/0108444 A1 | 5/2005 | Flauaus et al. | |
| 2005/0157653 A1* | 7/2005 | Zeitak | H04L 12/14 370/241 |
| 2005/0169279 A1* | 8/2005 | Magd et al. | 370/395.5 |
| 2005/0220143 A1 | 10/2005 | DelRegno et al. | |
| 2006/0030345 A1* | 2/2006 | Jain | H04W 4/24 455/515 |
| 2006/0126509 A1 | 6/2006 | Abi-Nassif et al. | |
| 2006/0176824 A1* | 8/2006 | Laver | H04L 12/24 370/241 |
| 2006/0203730 A1 | 9/2006 | Zur | |
| 2007/0002848 A1 | 1/2007 | Kudou et al. | |
| 2007/0147249 A1* | 6/2007 | Kumar | H04L 1/187 370/235 |
| 2007/0153695 A1* | 7/2007 | Gholmieh | H04L 43/0882 370/235 |
| 2007/0213038 A1* | 9/2007 | Masseroni et al. | 455/414.3 |
| 2007/0237078 A1* | 10/2007 | Hundscheidt et al. | 370/235 |
| 2008/0198746 A1 | 8/2008 | Kwan et al. | |
| 2009/0318164 A1* | 12/2009 | Kee | 455/456.1 |
| 2010/0034115 A1 | 2/2010 | Busch | |
| 2010/0172453 A1* | 7/2010 | Cankaya | H04J 3/0641 375/355 |
| 2011/0051723 A1 | 3/2011 | Rabie et al. | |
| 2012/0327779 A1 | 12/2012 | Gell et al. | |
| 2013/0044598 A1 | 2/2013 | Zhang et al. | |
| 2013/0128735 A1* | 5/2013 | Li | H04L 47/25 370/230 |
| 2013/0185454 A1 | 7/2013 | Guillemin et al. | |
| 2014/0126368 A1 | 5/2014 | Toy | |
| 2014/0269303 A1 | 9/2014 | Toy | |
| 2015/0295801 A1 | 10/2015 | Vega et al. | |

OTHER PUBLICATIONS

European Search Report dated Mar. 26, 2015 by the European Patent Office for Application No. 14191129.7 (Applicant—Comcast Cable Communications, LLC) (6 pages).

Ramakrishnan et al., IETF RFC 3178, Sep. 2001—The Addition of Explicit Congestion Notification (ECN) to IP.

IEEE 802.1QauTM—2010 IEEE Standard for Local and Metropolitan area network—Virtual Local Area Networks, Amendment 13: Congestion Notification, Apr. 23, 2010, IEEE Computer Society, LAN/MAN Standards Committee.

Chakchai et al., Enhanced Forward Explicit Congestion Notification (E-FECN) Scheme for Datacenter Ethernet Networks, 2008 International Symposium on Performance Evaluation of Computer and Telecommunication Systems (IEEE SPECTS 2008), Jun. 16-18, 2008, pp. 542-546.

\* cited by examiner ure to be able to perform certain functions, it is to be understood that a first congestion indicator is received

SYSTEMS AND METHODS FOR MANAGING A NETWORK

BACKGROUND

Networks can experience problems due to network constraints such as congestion. Certain network systems can monitor network conditions, but such systems suffer from deficiencies. Deficiencies can include failing to provide and/or analyze end-to-end and/or domain delay. Deficiencies can also include failing to provide and/or analyze congestion in a granular fashion, such as per link, per connection, or per class of service. Deficiencies can also include failing to make recommendations or taking appropriate actions to deal with congestion. This disclosure addresses such and other shortcomings related to network management.

SUMMARY

It is to be understood that both the following general description and the following detailed description are exemplary and explanatory only and are not restrictive, as claimed. Methods and systems for managing a network are disclosed. The methods and systems described herein, in one aspect, can manage congestion in a packet switched network. As an example, methods and systems described herein can be applied to point-to-point networks, point-to-multipoint networks, multipoint-to-multipoint networks, and the like.

In an aspect, methods can comprise receiving a first congestion indicator at a network point and reducing a data transfer rate to an effective bandwidth in response to receiving the first congestion indicator. A time period can be determined. If a second congestion indicator is received within the time period, the data transfer rate can be reduced to a factor of a committed information rate. If a second congestion indicator is not received within the time period, the data transfer rate can be increased to a target transfer rate.

In an aspect, methods can comprise receiving first delay information relating to one or more network points, wherein the delay information represents one or more of link level delay, connection level delay, and class of service level delay. The first delay information can be compared to a threshold. When the delay information exceeds the threshold, a first congestion control process associated with the one or more network points can be executed. If second delay information is received within a threshold time period, a second congestion control process associated with the one or more network points can be executed. If the threshold time period passes without receiving the second delay information, a third congestion control process associated with the one or more network points can be executed.

In another aspect, the methods can comprise receiving an indication of network performance. The indication can relate to a service flow. An effective bandwidth can be determined for the service flow. A first modification of one or more of an ingress data rate and an egress data rate associated with the service flow can be implemented based upon the effective bandwidth determined and in response to the indication of network performance. A second modification of the one or more of an ingress data rate and an egress data rate associated with the service flow can be implemented based upon the effective bandwidth determined and in response to one or more of a passing of a threshold time period and receiving a second indication of network performance.

In a further aspect, the methods can comprise receiving and addressing an indication of network delay and/or congestion. The indication can relate to, for example, a service flow. A service flow can comprise an end-to-end traffic flow (e.g., from customer premises equipment (CPE) to other CPE or network devices) defined by traffic parameters such as average output rate, maximum output burst, and the like. As an example, a service flow can comprise an Ethernet virtual connection between user network interfaces (UNIs) of a network. As a further example, a service flow can comprise a group of packets/frames flowing in an Ethernet virtual connection between UNIs and that belong to an application with a defined class of service. An aggregate service flow can comprise one or more service flows.

In an aspect, an effective bandwidth can be determined for the service flow. Further, an ingress and/or egress data rate associated with the service flow can be modified based upon the effective bandwidth determined.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
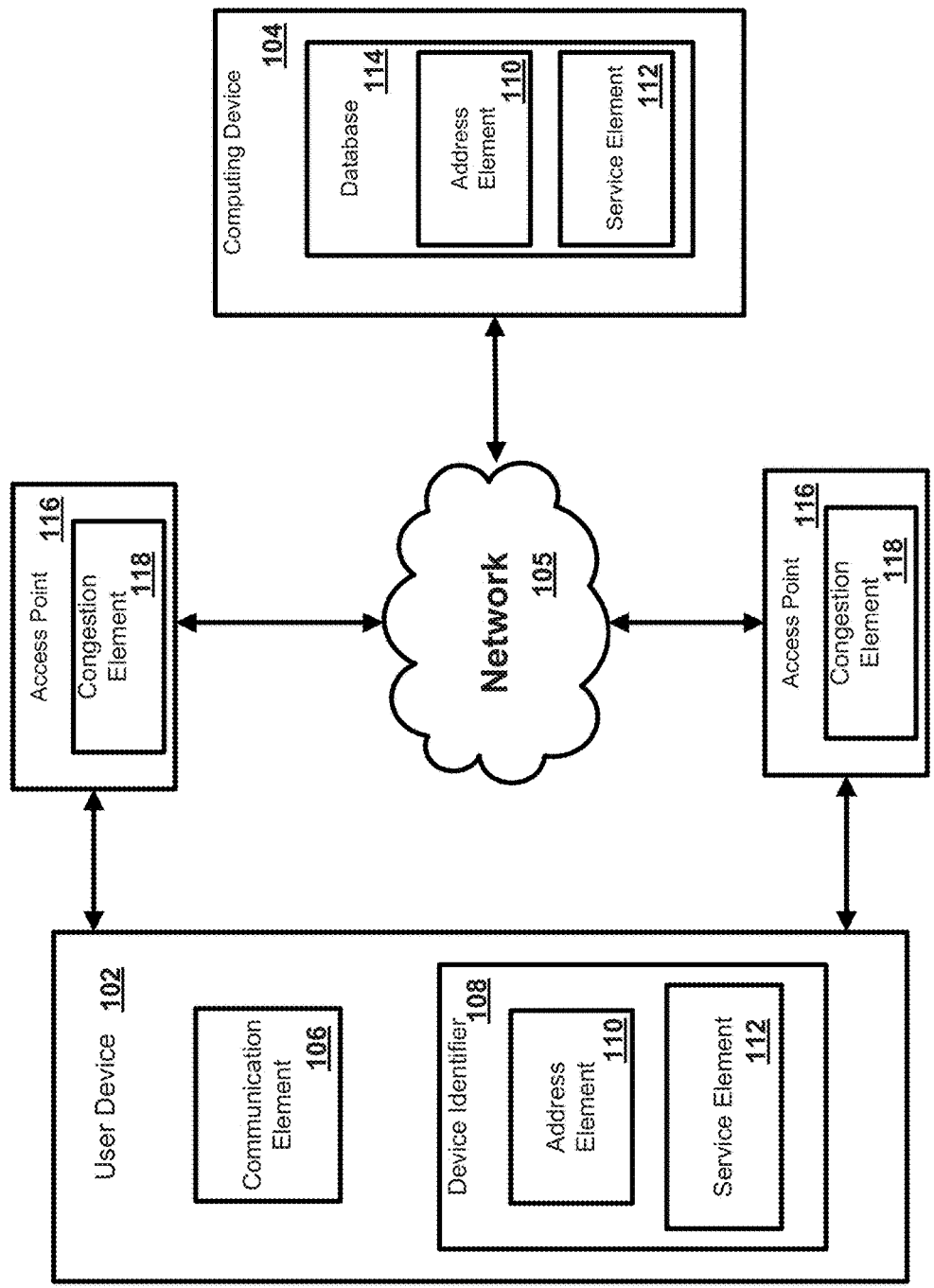
FIG. 1A is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, the methods, networks, and systems of the present disclosure can comprise receiving (or accessing) and addressing an indication of network delay exceeding a pre-set threshold and/or congestion parameter. The indication can relate to, for example, a point-to-point, point-to-multipoint, and/or a multipoint-to-multipoint network such as a packet network. The indication can relate to, for example, a service flow. A service flow can comprise an end-to-end traffic flow (e.g., from customer premises equipment (CPE) to other CPE or network devices) defined by traffic parameters such as average output rate, maximum output burst, and the like. As an example, a service flow can comprise an Ethernet virtual connection between user network interfaces (UNIs) of a network. As a further example, a service flow can comprise a group of packets/frames flowing in an Ethernet virtual connection between UNIs. The service flow can be associated with an application having a defined class of service. An aggregate service flow can comprise one or more service flows. As such, an effective bandwidth can be determined for the service flow. Effective bandwidth can be determined based upon one or more formulas provided herein. An ingress and/or egress data rate associated with the service flow can be modified based upon the effective bandwidth determined. Further, an ingress and/or egress data rate can be dynamically modified based on a periodic or continuous monitoring of network conditions (e.g., congestion, delay, failure, etc.). The methods, networks, and systems of the present disclosure provide a mechanism to further adjust data flow in a network if an initial rate adjustment is insufficient.

FIG. 1A illustrates various aspects of an exemplary network in which the present methods and systems can operate. The present disclosure is relevant to systems and methods for managing a network, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

The system and network can comprise a user device 102 in communication with a computing device 104 such as a server or Network Interface Device (NID), for example. The computing device 104 can be disposed locally, or remotely, relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback, such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102.

In an aspect, the service element 112 can comprise an identification of a service provider associated with the user device 102 and/or with the class of user device 102. As an example, the service element 112 can comprise information relating to, or provided by, a communication service provider that is providing or enabling communication services to the user device 102. Services can be data services, such as internet access, financial data transfers, or various file transfer, voice, and/or video services, or a combination thereof. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources, such as data, devices, and files. As an example, the computing device can be configured as a central location, a headend, or a processing facility, which can receive content (e.g., data, input programming) from multiple sources. The computing device 104 can combine the content from the various sources and can distribute the content to user locations via a distribution system.

In an aspect, the computing device 104 can manage the communication between the user device 102 and a database 114 for sending and receiving data therebetween. As an example, the database 114 can store a plurality of files, webpages, user identifiers or records, or other information. As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

Figure 1B:
FIG. 1B is a block diagram of an exemplary network.
Figure 1C:
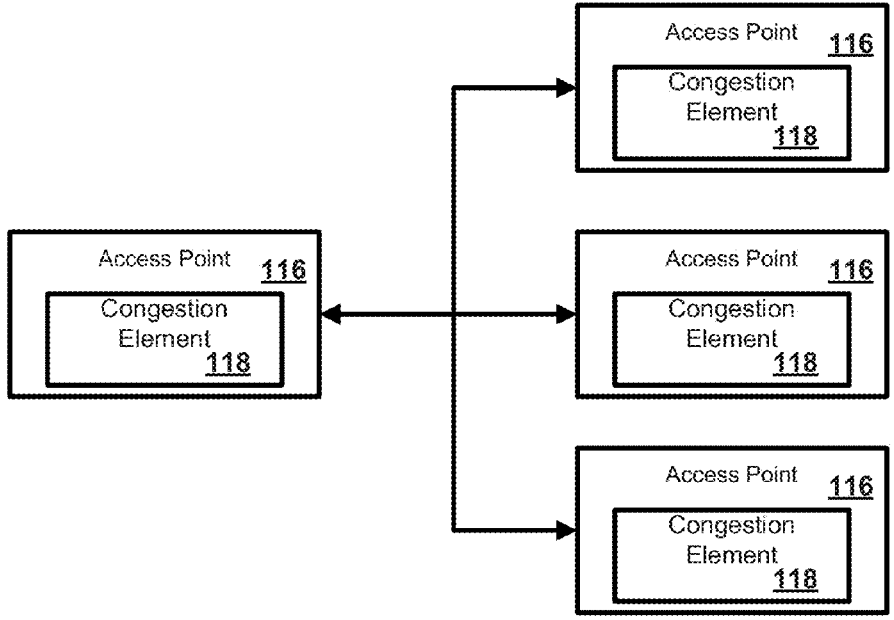
FIG. 1C is a block diagram of an exemplary network.
Figure 1D:
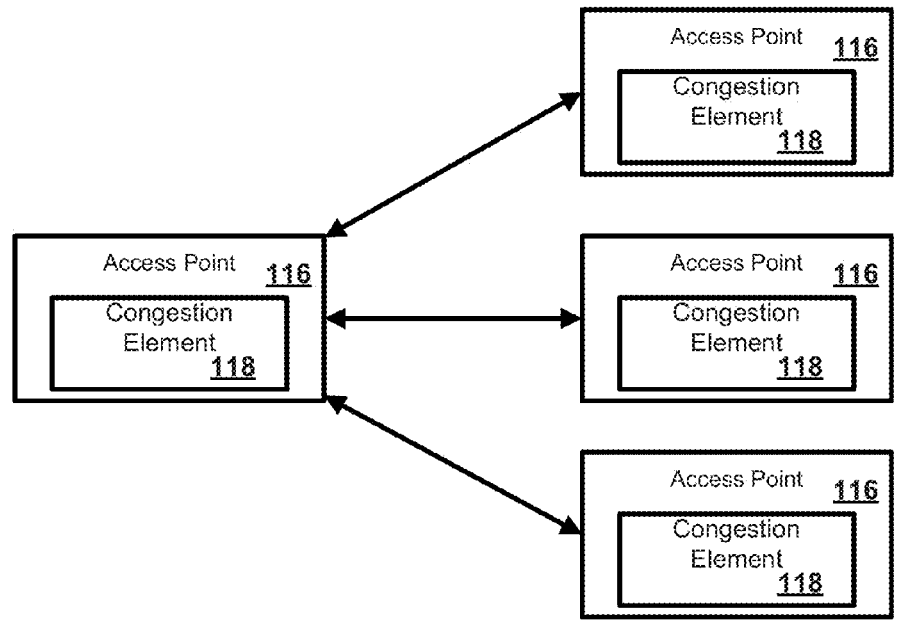
FIG. 1D is a block diagram of an exemplary network.

In an aspect, one or more access points 116 can be in communication with network 105. One or more access points 116 can be a node, a router, a switch, a domain boundary, a network interface, or other communication device. As an example, one or more of the access points 116 can facilitate the connection of a device, such as user device 102, to the network 105. As a further example, one or more of the access points 116 can be configured as a virtual local area network (VLAN) access point. In an aspect, one or more access points 116 can be configured as part of a Carrier Ethernet Network. In another aspect, the access points 116 can be domain boundaries, nodes, and network device elements, for example, and can be configured as a point-to-point configuration (FIG. 1B), a multipoint-to-multipoint configuration (FIG. 1C), and/or a point-to-multipoint configuration (FIG. 1D). Any number of access points 116, such as domain boundaries, nodes, and network elements, can be configured in any configuration. The access points 116 can be configured as endpoints or domain boundaries in the respective configuration.

Returning to FIG. 1A, in an aspect, one or more of the access points 116 can comprise a congestion element 118. As an example, the congestion element 118 can be configured to receive/transmit data in packets or Ethernet frames. As a further example, the congestion element 118 can be configured to analyze some, a portion of, or all of the frames or packets to determine congestion information or transmit frames or packets comprising a congestion indicator, such as delay information. In an aspect, the congestion element 118 can comprise a traffic conditioning element configured to analyze and condition (e.g., modify, format, manipulate, append, fragment, etc.) data packets. The congestion element 118 can comprise hardware, software, or a combination thereof.

In another aspect, the congestion element 118 can be configured to determine (e.g., measure, calculate, analyze, etc.) a delay parameter. For a point-to-point configuration or a point-to-multipoint configuration (such as E-Tree networks), one-way delay(s) or round trip delay(s) (RTD) can be determined between two end points (e.g., domain boundaries), such as access points 116 on the network. If the delay exceeds a pre-set threshold, an indication, such as a threshold crossing alert (TCA), can be generated and/or transmitted. The indication can be accessed or received and then processed, and can trigger execution of a congestion control process between the end-point pair. As an example, the end points (e.g., access points 116) can represent two user interfaces, boundaries of a domain on a given Ethernet virtual connection (EVC) of a carrier Ethernet network, or boundaries of a domain on a label switched path (LSP) in MPLS networks.

In an aspect, the end points can be identified by a MEP (Maintenance End Point), as in carrier Ethernet and MPLS networks, by an IP address as in IP networks, by a MAC address as in Ethernet networks, or other identifier.

In another aspect, a delay can be determined for a one-way or round trip, depending on the set threshold. For example, in a point-to-point configuration, the delay can be determined at multiple times over a defined interval and TCA can be triggered based on a set of measurements. As a further example, delays can be determined per unit of time, such as per second, twice per second. Delays can also be determined based on an average over an interval time, such as one minute, five minutes, fifteen minutes, or some other time interval. As such, if the average determined delay exceeds a threshold, an indicator such as TCA can be generated and/or transmitted.

In an aspect, DE bits in a service-Tag (S-Tag) of Ethernet frames can be used to indicate congestion end-to-end or on a domain basis. For example, when a downstream node is congested, the node can provide a congestion indicator in one or more frames. The one or more frames comprising the congestion indicator can be transmitted to one or more upstream nodes to indicate congestion. As a further example, the congestion indicator can be a bit value such as a DE bit set to a value of "1," (e.g., DE=1).

In an aspect, when an upstream node receives the one or more frames with DE=1, the upstream node can transmit the received one or more frames with DE=1 to other upstream nodes without changing the DE bit value. If the upstream node that receives the one or more frames with DE=1 is a boundary node, the boundary node can reduce a data rate for downstream transmission and set the DE bit to zero in the reverse direction. In an aspect, the congestion indicator (e.g., DE bit) can be used to indicate congestion for a port, connection, and/or class of service.

In an aspect, a sliding window mechanism (FIG. 4) can be applied to the delay measurements. For example, the measurement interval can be per second or less, and TCA can be issued at the end of a one minute period, five minute period, fifteen minute period, or some other time interval.

In an aspect, for a point-to-multipoint configuration, delays can be determined multiple times and an indication can be generated and/or transmitted based on one or more of the following processes. As an example, one or more of the following processes can be executed based upon processing capacity at a root (e.g., root node, root access device, etc.):

a) measure the delay from a root to each leaf (one-way or round-trip) and trigger TCA per root-leaf connection;

b) Divide N leaves into K sets of leaves, measure the delay and trigger TCA on a per set basis, and apply congestion control mechanism per set basis, $\{L_1, L_2, L_k\}$, where $k=1, 2, \ldots, N$; each $L_k$ will have m members where $m=1, 2, \ldots, S$, where $S \leq N$; $TCA_k$ is the TCA of $L_k$. The measurement interval can be per second or smaller, and $TCA_k$ can be issued per one minute, five minute, fifteen minute, or some other time interval; and/or c) Measure delay between root and randomly selected leaves every second (or other time interval), issue TCA and apply congestion control per point-to-multipoint configuration.

In an aspect, for a multipoint-to-multipoint configuration, delays can be determined multiple times and an indication can be generated and/or transmitted based on one or more of the following processes. As an example, one or more of the following process can be executed based upon network load:

a) Measure the delay (one-way or round-trip) between interface pairs (e.g., roots, leaf, nodes, access points, etc.), trigger TCA per interface pair connection, and apply congestion control per interface pair;

b) Divide X number of interfaces into K sets, measure the delay and trigger TCA on a per set basis, and apply congestion control mechanism per set basis. $\{I_1, I_2, I_k\}$ where $k=1, 2, \ldots, N$; each $I_k$ will have m members where $m=1, 2, \ldots, S$, where $S<N$; $TCA_k$ is the TCA of $I_k$. The measurement interval can be per second or smaller, and $TCA_k$ can be issued per one minute, five minute, fifteen minute, or some other time interval; and/or c) Measure delay between root and randomly selected interface pair every second (or other time interval), issue TCA and apply congestion control per multipoint-to-multipoint configuration.

Figure 2:
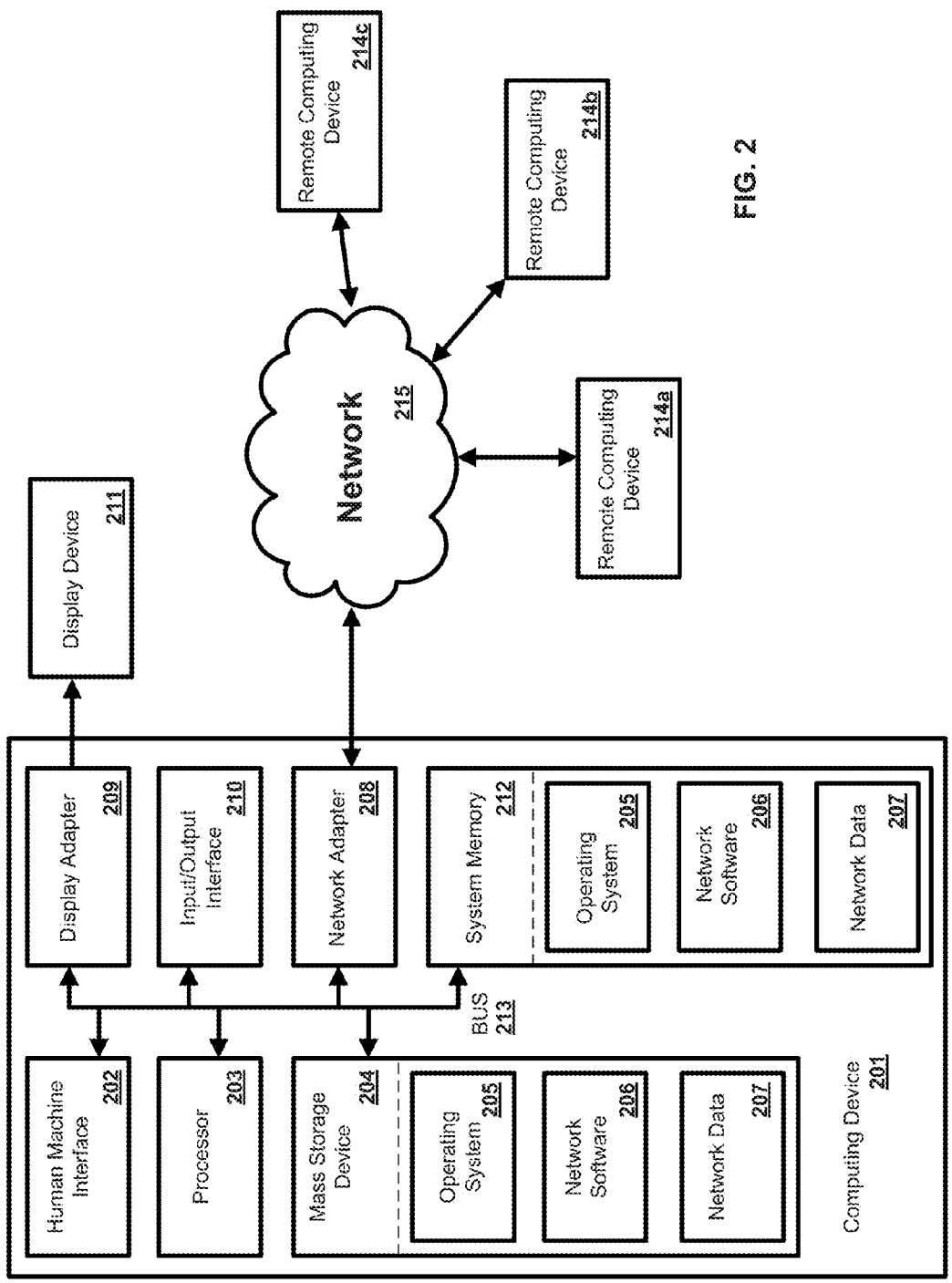
FIG. 2 is a block diagram of an exemplary computing device.

In an exemplary aspect, the methods and systems can be implemented on a computing system, such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. One skilled in the art will appreciate that this is a functional description and that the respective functions can be performed in a system by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device, mouse, microphone, joystick, scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3A:
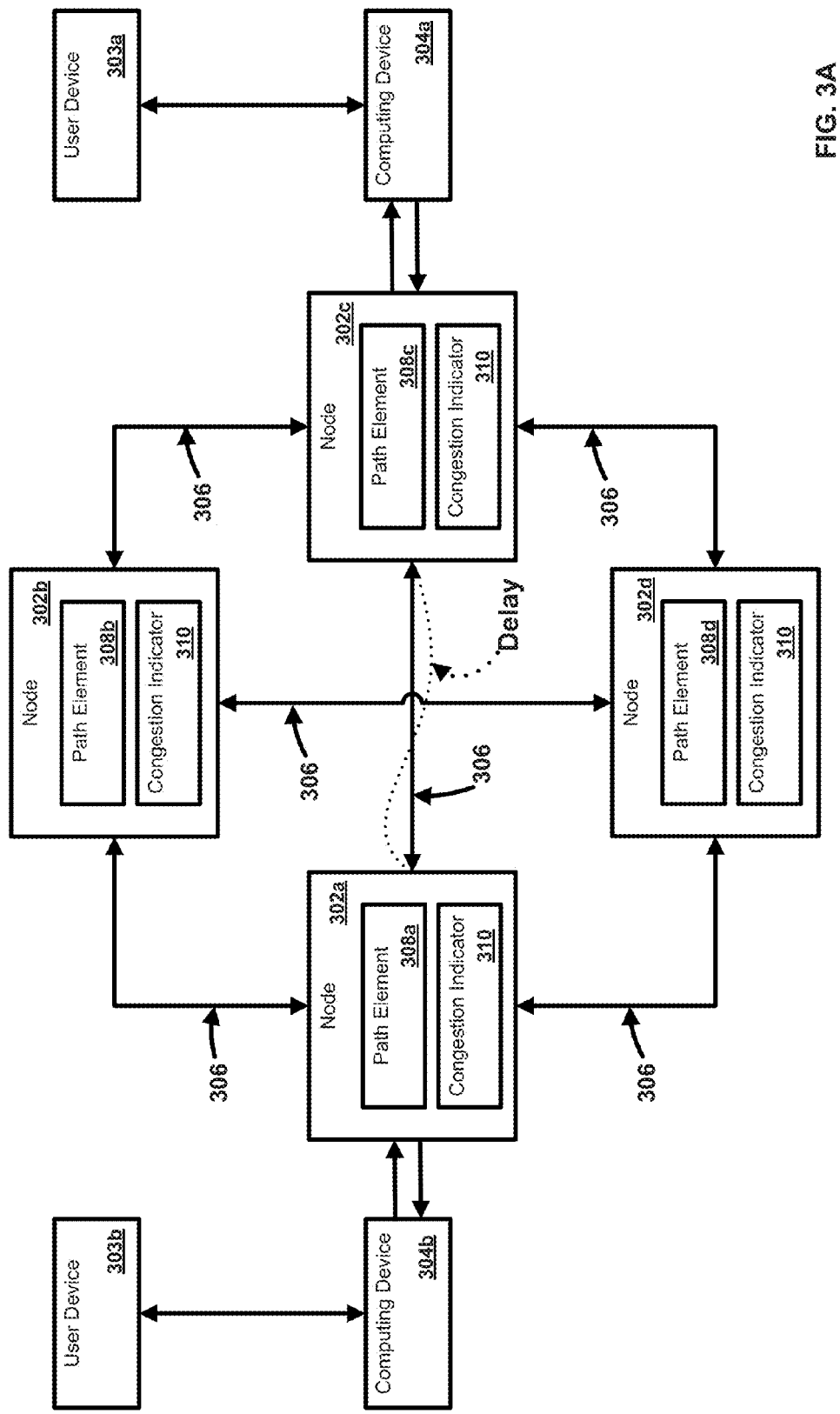
FIG. 3A is a diagram of an exemplary system and network.
Figure 3B:
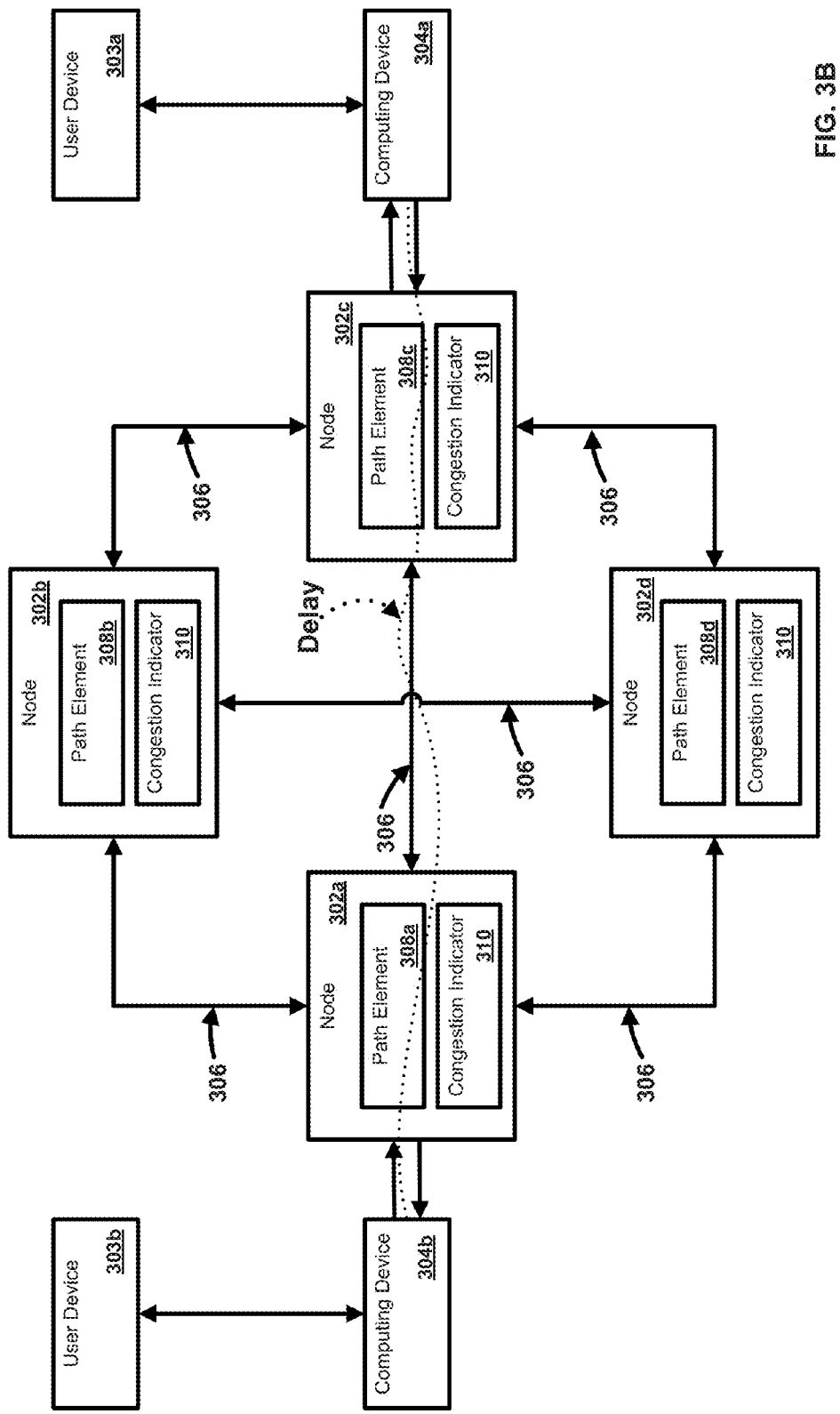
FIG. 3B is a diagram of an exemplary system and network.

FIGS. 3A-3B illustrate an exemplary system and network. In an aspect, plurality of nodes 302a, 302b, 302c, 302d can be in communication with one or more user devices 303a, 303b and/or one or more computing devices 304a, 304b. One or more of the nodes 302a, 302b, 302c, 302d can be a network access point, a router, a switch, a network interface, or other communication device. As an example, one or more user devices 303a, 303b can be an electronic device, such as a computer, a smartphone, a laptop, a tablet, a set top box, a display device, or other device capable of communicating with one or more of the nodes 302a, 302b, 302c, 302d of the network. As a further example, one or more computing devices 304a, 304b can be a server, a gateway, customer premises equipment (CPE), a network interface device (NID), an optical networking unit (ONU), a headend, a terminal server, a modem, a termination system, or other network device. As an example, one or more of the nodes 302a, 302b, 302c, 302d can be configured to communicate with at least one of the other of the nodes 302a, 302b, 302c, 302d and/or one or more of the computing devices 304a, 304b via one or more communication paths 306. In an aspect, the one or more communication paths 306 can comprise one or more uninterrupted communication links, sequential links, pre-defined paths or links, and/or intervening nodes. Links can comprise a single point-to-point connection between two devices or access points. Paths can comprise one or more links. As an example, one or more of the communication paths 306 can comprise one or more of the nodes 302a, 302b, 302c, 302d. As a further example, one or more of the nodes 302a, 302b, 302c, 302d can be configured as a mesh network. In an aspect, one or more of the communication paths 306 can be configured to transmit one or more services.

In an aspect, one or more path elements 308a, 308b, 308c, 308d can comprise information relating to one or more of the communication paths 306. One or more path elements 308a, 308b, 308c, 308d can comprise or have access to information relating to congestion, path priority, path cost, capacity, bandwidth, signal strength, latency, error rate, path usage, and the like. As an example, the path element 308a, 308b, 308c, 308d can be or comprise the congestion element 118 (FIG. 1A). As a further example, the path elements 308a, 308b, 308c, 308d can be configured to determine and/or generate a congestion indicator 310 such as a value of the DE bit in a received network frame.

As illustrated in FIG. 3A, congestion can occur at a boundary node resulting in delay(s) between endpoints, such as between nodes 302a and 302c. In an aspect, the delay between nodes 302a and 302c can be determined on a one-way (either direction) or round-trip basis. Delay can be determined by known or future available techniques. As an example, a buffer associated with a port (e.g., access port or network port) of the nodes 302a, 302c can exceed a pre-set threshold ($T_B$). Accordingly, the port itself is congested, and the nodes 302a, 302c can activate a congestion control algorithm to reduce a data rate in both directions for all connections transported on that port. As a further example, the nodes 302a, 302c can then transmit frames having DE=0.

In an aspect, congestion can occur downstream of a boundary node, such as nodes 302a, 302c. As an example, FIG. 3B illustrates congestion resulting in delay between computing devices 304a and 304b. In an aspect, a delay between computing devices 304a and 304b can be determined on a one-way or round-trip basis. In another aspect, congestion information can be determined on a per port basis for a given device (e.g., node). For example, a port of a boundary node can receive a frame with congestion information (e.g., DE=1 due to downstream congestion). Although the port of the boundary node is not congested, a reduction in data rate transmission from the boundary node port may be required to address network congestion. As an example, the port receiving the congestion information can be set to a congested state in order to trigger a congestion control algorithm. As a further example, the PAUSE flow (frame) control defined by IEEE 802.3x standards, or similar software and/or hardware controls, can be used as a congestion control algorithm. PAUSE flow control can be used to temporarily stop data transmission such as packets to one or more network devices. In an aspect, when a triggering event such as congestion or failure occurs, rather than decreasing a rate of transmission, the PAUSE flow control can be implemented until the triggering event is resolved. As an example, a PAUSE frame can be used to halt the transmission of a device for a specific or indefinite period of time. In an aspect, congestion information can be determined based on various parameters and/or entities such as on a connection (e.g., Ethernet connection, Ethernet virtual connection, etc.) basis and/or class of service (CoS) flow basis. In a further aspect, various control algorithms can be implemented based on the determined congestion information.

In an aspect, delay information can be determined between end-points, such as nodes 302a, 302b, 302c, 302d and/or computing devices 304a, 304b for a point-to-point configuration, a point-to-multipoint configuration (such as E-Tree networks), and a multipoint-to-multipoint configuration. One-way delays and/or round trip delays (RTD) can be determined between source and destination end points or domain boundaries on the network. If the delay exceeds a pre-set threshold, an indication such as a threshold crossing alert (TCA) can be generated and/or transmitted. As an example, the delay threshold may be set at about 70%-80% of a parameter such as SLA (Service Level Agreement) value. As a further example, if the one-way delay SLA value is 30 msec, a threshold can be set to 21-24 msec. Other thresholds and mechanisms for determining thresholds can be used. The indication can be accessed or received and then processed and can trigger execution of a congestion control process between the end-point pair. As an example, the end points (e.g., computing devices 304a, 304b, nodes 302a, 302b, 302c, 302d) can represent two user interfaces, boundaries of a domain on a given EVC of a carrier Ethernet network, or boundaries of a domain on an LSP in MPLS networks.

In an aspect, the domain boundaries can be identified by a MEP (Maintenance End Point) as in a carrier Ethernet and MPLS networks, by an IP address as in IP networks, by a MAC address as in Ethernet networks, or other identifier.

In another aspect, delays can be determined one-way or round trip, depending on the set threshold. For example, in a point-to-point configuration, the delay can be determined at multiple times over a defined interval and TCA can be triggered based on a set of measurements. As a further example, delays can be determined per second and averaged over an interval of one minute, five minutes, fifteen minutes, or some other time interval. As such, if the average determined delay exceeds a threshold, an indicator such as TCA can be generated and/or transmitted.

In an aspect, delay can be determined over a range of times (e.g., time interval, sequence of times, sequence of intervals, etc.). For example, a sliding window technique, or an implementing mechanism (FIG. 4) can be applied to determine delay. The sliding window can represent or be a dynamic measurement interval of time. As a further example, a measurement interval (e.g., sliding window) can be applied on a per second or a smaller interval basis and TCA can be issued at the end of a one minute period, a five minute period, a fifteen minute period, or some other time interval. In another aspect, the sliding window mechanism can be used to determine a delay based on frame/packet delay (one-way or RT) during a sequence of consecutive time intervals and during a previous time interval preceding the sequence. For example, when the delay for the previous time interval is defined as below a threshold and if the delay is equal to or above a threshold for each time interval in the current sequence, then a time interval at the beginning of the current sequence can be defined as equal or above the threshold. Otherwise, the time interval at the beginning of the sequence can be defined as below the threshold. In another aspect, when the time interval preceding the current sequence is defined as equal to or above the threshold and if the delay is below the threshold for each time interval in the current sequence, then the time interval at the beginning of the current sequence can be defined as below the threshold. Such an approach can minimize the instances of TCA generation due to temporary delay fluctuations.

Figure 4:
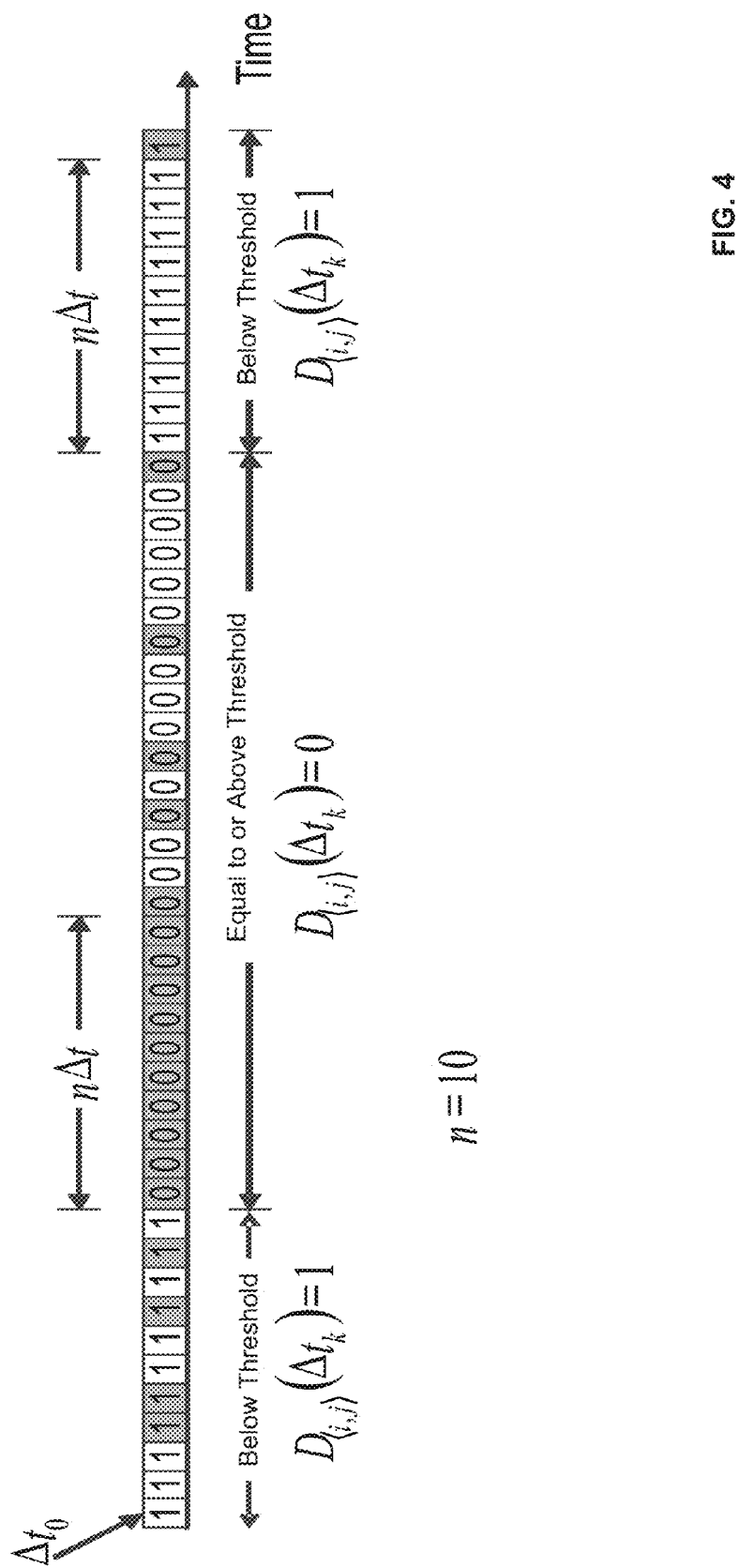
FIG. 4 is a diagram of a sliding window method.

As illustrated in FIG. 4, the delay (e.g., delay performance) for a service flow from ingress $UNI_i$ to egress $UNI_j$ for a time interval T can be based on one or more of the following parameters:

$\Delta t$ can be defined as a time interval smaller than T;

$D_T$ can be defined as a packet/frame delay threshold which if equaled or exceeded suggests equal or above the threshold delay, triggering TCA (Threshold Crossing Alert);

n can be defined as a number of consecutive time intervals ($\Delta t$) over which delay is to be assessed;

Each $\Delta t_k$ in T can be defined as equal or above the threshold or below the threshold and is represented by $D_{(i,j)}(\Delta t_k)$, where $D_{(i,j)}(\Delta t_k)=1$ indicates $\Delta t_k$ is below the threshold and $D_{(i,j)}(\Delta t_k)=0$ indicates $\Delta t_k$ is equal to or above the threshold, and where $D_{(i,j)}(\Delta t_k)$ can be based on the following function (packet/frame delay function):

For k=0

$$D_{(i,j)}(\Delta t_0) = \begin{cases} 0 & \text{if Delay} > D_T, \forall m = 0, 1, \ldots n-1 \\ 1 & \text{otherwise} \end{cases}$$

For k=1, 2, . . .

$$D_{(i,j)}(\Delta t_k) = \begin{cases} 0 & \text{if } D_{(i,j)}(\Delta t_{k-1}) = 1 \text{ and Delay} \geq D_T, \\ & \forall m = k, k+1, \ldots, k+n-1 \\ 1 & \text{if } D_{(i,j)}(\Delta t_{k-1}) = 0 \text{ and Delay} < D_T, \\ & \forall m = k, k+1, \ldots, k+n-1 \\ D_{(i,j)}(\Delta t_{k-1}) & \text{otherwise} \end{cases}$$

An implementation can to use 1 when the delay is equal or above the threshold, and 0 when the delay is below the threshold.

In an aspect, for a point-to-multipoint configuration, the delay can be determined multiple times and an indication can be generated and/or transmitted based on one or more of the following processes. As an example, one or more of the following processes can be executed based upon processing capacity at a root (e.g., root node, root access device, etc.):

a) Measure the delay from a root to each leaf (one-way (in either direction) or round-trip) and trigger TCA per root-leaf connection or flow, and apply congestion control per root-leaf connection or flow;

b) Divide N leaves into K sets of leaves, measure delay and trigger TCA on a per set basis, and apply congestion control mechanism per set basis, $\{L_1, L_2, L_k\}$ where k=1, 2, . . . , N; each $L_k$ will have m members where m=1, 2, . . . , S where S≤N; $TCA_k$ is the TCA of $L_k$. The measurement interval can be per second, and $TCA_k$ can be issued per one minute, five minute, fifteen minute, or some other time interval; and/or c) Measure the delay between root and randomly selected leaves every second (or other time interval), issue TCA and apply congestion control per point-to-multipoint configuration.

In an aspect, for a multipoint-to-multipoint configuration, the delay can be determined multiple times and an indication can be generated and/or transmitted based on one or more of the following processes. As an example, one or more of the following process can be executed based upon network load:

a) measure the delay (one-way (in either direction) or round-trip) between interface pairs (e.g., roots, leaf, nodes, access points, etc.) and trigger TCA per interface pair connection, and apply congestion control per interface pair or a connection or a flow between the interface pairs;

b) Divide X number of interfaces into K sets, measure delay and trigger TCA on a per set basis, and apply congestion control mechanism per set basis, ($I_1, I_2, I_k$) where k=1, 2, . . . , N; each $I_k$ will have m members where m=1, 2, . . . , S where S≤N; $TCA_k$ is the TCA of $I_k$. The measurement interval can be per second, and $TCA_k$ can be issued per one minute, five minute, fifteen minute, or some other time interval; and/or c) Measure the delay between root and randomly selected connections or flows between an interface pair or an end-point pair every second (or other time interval), issue TCA and apply congestion control per multipoint-to-multipoint configuration.

In an aspect, when a congestion indication (e.g., TCA) is received at a node, the data rate can be modified in response to the indication. As an example, the data rate can be configured based upon one or more of the following formulas:

$$BWEF^{ASF} = \sum_{n=1} BWEF_n^{SF}; \quad (EQ\ 1)$$

if it is port level congestion, where $BWEF^{SF}_n$ represents the effective bandwidth of a service flow and $BWEF^{ASF}$ represents effective bandwidth for the aggregated service flow of one or more service flows.

In an aspect, if congestion persists after the data rate is configured by EQ1 or the current rate is already at the effective bandwidth, then the congested node can reduce its transmission data rate to $$CIR^{ASF} = \sum_{n=1}^{N} CIR_n^{SF}; \quad (EQ\ 2)$$

if it is port level congestion, where $CIR^{SF}_n$ represents the committed information rate of a service flow, and $CIR^{ASF}$ represents the committed information rate for the aggregate service flow of one or more service flows.

In an aspect, frame colors can be identified at an External Network-Network Interface (ENNI) and egress direction of an UNI in Ethernet networks. Colors can be used to identify the bandwidth profile conformance of a particular data packet or portion thereof, such as a service frame. As an example, green can indicate conformance with a committed rate of the bandwidth profile. As another example, yellow can indicate non-conformance with committed rate, but conformance with an excess rate of the bandwidth profile. As a further example, red can indicate non-conformance with a committed rate and an excess rate of the bandwidth profile. In another aspect, priority code point (PCP) can be adequate to represent less than eight Class of Services (CoS) and two colors (e.g., Green and Yellow). As an example, one or more nodes can discard (e.g., delete, do not transmit, etc.) yellow frames first and then green frames to reduce frames in the buffer below threshold $T_B$ for port-base flow, or to for connection-based flow or $t_{CB}$ for CoS-based flow. As a further example, thresholds ($T_B, t_B, t_{CB}$) can be defined such that a buffer size that is determined to be below the defined thresholds can trigger a reduction in transmission data rates to an effective bandwidth rate or to a committed information rate.

In an aspect, transmitted and received frame counts can be monitored, and correction can be made to ensure the updated transmission data rates. As an example, in order to allow statistical multiplexing with agreed packet loss ratio or frame loss ratio (FLR), effective bandwidth can be used in allocating bandwidth. As a further example, effective bandwidth can be calculated for each service flow (SF), and a sum of the effective bandwidths can be assigned to aggregate service flow (ASF).

In an aspect, a service flow can comprise an end-to-end traffic flow defined by traffic parameters, such as average output rate, maximum output burst, and the like. As an example, a service flow can comprise an Ethernet virtual connection between user network interfaces (UNIs) of a network. As a further example, a service flow can comprise a group of packets/frames flowing in an Ethernet virtual connection between UNIs and belong to an application with a defined class of service. An aggregate service flow can comprise one or more service flows.

In an aspect, effective bandwidth can be calculated based on one or more of the following formulas:

$$BWEF^{ASF} = \sum_{n=1}^{N} BWEF_n^{SF}; \quad (EQ\ 3)$$

instead of $$\text{Total Bandwidth} = CIR^{ASF} + EIR^{ASF}, \quad (EQ\ 4)$$

where $$CIR^{ASF} = \sum_{n=1}^{N} CIR_n^{SF}; \quad (EQ\ 5)$$

$$EIR^{ASF} = \sum_{n=1}^{N} EIR_n^{SF}; \quad (EQ\ 6),$$

where CTR can be defined as the average output rate of the shaper or a policer for green frames, CBS can be defined as maximum output burst of the shaper or a policer for green frames, EIR can be defined as average output rate of the shaper or policer for yellow frames, and EBS can be defined as maximum output burst of the shaper or policer for yellow frames.

In an aspect, Effective Bandwidth for a given SF can be calculated as $$BWEF^{SF}=\max(CIR,PR/(1+(\max(jitter_{A-Z}, jitter_{Z-A})*PR)/MBS), \text{ where } PR=CIR+ETR \quad (EQ7).$$

Equation EQ7 can be valid for service flows (or EVCs or CoS) with no loss SLAs (service level agreements). In an aspect, the effective bandwidth for a given service flow (or EVCs or CoS) with loss SLAs, can be calculated as:

$$BWEF^{SF}=\max(CIR,PR*\alpha) \quad (EQ8),$$

where $\alpha=[(\beta-b)+\sqrt{(\beta-b)^2+4(CIR/PR)\beta*b}]/2\beta$, where $\beta=(\ln 1/FLR)(MBS/CIR)(1-CIR/PR)PR$, and where $Jitter_{A-Z}$ is a delay variation between a pair of packets of a given connection or flow travelling from end point A of the connection or flow to the end point Z of the connection or flow. $Jitter_{Z-A}$ is the delay variation between a pair of packets of a given connection or flow travelling from the end point Z of the connection or flow to the end point A of the connection or flow. PR is the peak rate and can be defined by a port rate or EIR+CIR for a given connection or flow. FLR is the frame loss ratio and can be defined by ((the number of frames transmitted minus the number of frames received)/(number of frames transmitted)) in a given connection or flow. MBS is the maximum output burst of a shaper or policer associated with the PR.

In an aspect, for a point-to-point configuration (e.g., connection) data rates (e.g., at one or more endpoints of the connection) can be reduced to $BWEF^{SF}$ as defined herein.

In an aspect, for a point-to-multipoint configuration (e.g., connection) data rates (e.g., for each root-leaf pair) can be reduced to a respective $BWEF^{SF}$ as defined herein. If congestion persists, then the data rate can be reduced to $CIR^{SF}$ for each pair.

In an aspect, for a multipoint-to-multipoint configuration (e.g., connection or flow) data rates (e.g., for each interface pair, root-leaf pair, etc.) can be reduced to a respective $BWEF^{SF}$ as defined herein. If congestion persists, then the data rate can be reduced to $CIR^{SF}$ for each pair.

In an aspect, for a multipoint-to-multipoint configuration (e.g., connection), when a $TCA_k$ is triggered for a set of root-leaf or interface pairs, then data rates in one or more directions (e.g., ingress and egress) for the set can be reduced. In an aspect, egress data rates can be modified based on one or more of the following formulas:

$$BWEF_{E,m}^{SF} = \left(\sum_{m=1}^{S-1} BWEF_{l,m}^{SF}\right)/(S-1) \text{ for } I_k; \quad \text{(EQ 9)}$$

If congestion persists, then the rate can be reduced to $CIR_{E,m}^{SF}$ $$CIR_{E,m}^{SF} = \left(\sum_{m=1}^{S-1} CIR_{l,m}^{SF}\right)/(S-1) \text{ for } I_k; \quad \text{(EQ 10)}$$

In an aspect, ingress data rates for each interface can be reduced to $BWEF_{I,m}^{SF}$. If congestion persists, then the rate can be reduced to $CIR_{I,m}^{SF}$.

In an aspect, a current data rate (CR), such as an ingress rate or egress rate, can be set to a predetermined target data rate (TR). In another aspect, a network performance indication, such as a delay indicator or a congestion indication (i.e. frames with DE=1 or TCA or $TCA_k$ due to excess delay) can be received. As an example, a congestion indication can be received for a service flow (SF).

In response to the congestion indication, the CR can be reduced to an effective bandwidth BWEF, whereby CR becomes $CR_{new}$. As an example, the data rate for a service flow can be reduced to $BWEF^{SF}$. After a first time period (e.g., predetermined time period, calculated time period), the data rate $CR_{new}$ can be returned to TR if there is no congestion indication. As an example, the first time period can be a factor of a round trip time between a first network point (source) and another network point (destination). Network points can be nodes, access points, end points, boundary devices, switches, etc. Network points can reference a location in a network such as along a link, at a device, at a boundary, etc. As another example, the first time period can be a factor of a sliding window time period, for example, $n*\Delta t$, where n=1, 2, ... 10 integer values and $\Delta t$ can be 3.33 msec, 10 msec, 100 msec, 1 sec, 10 sec, 1 min, and 10 min, etc. (e.g., similar to the sliding window of FIG. 4). As a further example, the first time period can be determined based on n*RTT, where RTT is a round trip time between a source point and a destination point (not necessarily between boundary nodes, since boundary nodes may not be the source and destination for user frames) and where n=1, 2, ... 10 integer values (e.g., 2 can be a default). If a congestion indication or delay indication is received within the first time period, $CR_{new}$ can be further reduced to a committed information rate (CIR).

In an aspect, with $CR_{new}$=CIR, network performance can be monitored during at least a second time period (e.g., predetermined time period, calculated time period). As an example, the second time period can be a factor of a round trip time between a first network point (source) and another network point (destination). As another example, the second time period can be a factor of a sliding window time period, for example, $n*\Delta t$, where n=1, 2, ... 10 integer values and can be 3.33 msec, 10 msec, 100 msec, 1 sec, 10 sec, 1 min, and 10 min, etc. (e.g., similar to the sliding window of FIG. 4). As a further example, the second time period can be determined based on n*RTT.

If a congestion indication is received within the second time period, $CR_{new}$ can be updated, for example, according to $CR_{new}$=max (CIR/2, ($CR_{old}$−CIR/m)) where m=2, 4, 8, 16, 32, 64, 128, 256, 512 and $CR_{old}$ is the CR at the end of the first time period. If congestion indication is not received within the second time period, $CR_{new}$ can be updated, for example, according to $CR_{new}$=min (EBW, ($CR_{old}$+CIR/m)) and $CR_{old}$ is the CR at the end of the first time period.

In an aspect, network performance can be monitored during at least a third time period (e.g., predetermined time period, calculated time period). As an example, the third time period can be a factor of a round trip time between a first network point (source) and another network point (destination). As another example, the third time period can be a factor of a sliding window time period, for example, $n*\Delta t$, where n=1, 2, ... 10 integer values and $\Delta t$ can be 3.33 msec, 10 msec, 100 msec, 1 sec, 10 sec, 1 min, and 10 min, etc. (e.g., similar to the sliding window of FIG. 4). As a further example, the second time period can be determined based on n*RTT.

If a congestion indication is received within the third time period, $CR_{new}$ can be updated, for example, according to $CR_{new}$=max (CIR/2, ($CR_{old}$−CIR/m)) where m=2, 4, 8, 16, 32, 64, 128, 256, 512 and $CR_{old}$ is the CR at the end of the second time period. If a congestion indication is not received within the third time period, $CR_{new}$=min (EBW, ($CR_{old}$+CIR/m)) and $CR_{old}$ is the CR at the end of the second time period.

Network monitoring and/or rate adjustment can continue in a similar manner as implemented during the first time period, the second time period, and/or the third time period. As an example, rate adjustment can be continued until $CR_{new}$=EBW or $CR_{new}$=CIR/2. As another example, when $CR_{new}$=EBW, a rate adjustment process can be implement that is similar to the rate adjustment process implemented during the first time period. As a further example, when $CR_{new}$=CIR/2, a rate adjustment process can be implemented similar to the rate adjustment process implemented during the third time period.

In an aspect, in a point to multi-point (PT-MPT) configuration, when a TCA is triggered for a Root-Leaf pair, then the rate for that pair can be reduced to $BWEF^{SF}$. If congestion persists, then the rate will be reduced to $CIR^{SF}$. Such rate control can be accomplished based on the CR manipulation discussed herein, whereby EBW and CIR can be replaced by $BWEF^{SF}$ and $CIR^{SF}$, respectively. When a $TCA_k$ is triggered for a set of Root-Leaf pairs, then rates can be reduced to $BWEF^{SF}$. If congestion persists, then the rate can be reduced to $CIR^{SF}$. Such rate control can be accomplished based on the CR manipulation discussed herein, whereby EBW and CIR can be replaced by $BWEF^{SF}$ and $CIR^{SF}$, respectively, for each flow within the set $I_k$.

In an aspect, in a multi-point to multi-point configuration (MPT-MPT), when a TCA is triggered for a Root-Leaf or leaf-leaf pair, then the rate for that pair can be reduced to $BWEF^{SF}$. If congestion persists, then the rate will be reduced to $CIR^{SF}$. Such rate control can be accomplished based on the CR manipulation discussed herein, whereby EBW and CIR can be replaced by $BWEF^{SF}$ and $CIR^{SF}$, respectively. When a $TCA_k$ is triggered for a set of Root-Leaf pairs, then rates can be reduced to $BWEF^{SF}$. If congestion persists, then the rate can be reduced to $CIR^{SF}$. Such rate control can be accomplished based on the CR manipulation discussed herein, whereby EBW and CIR can be replaced by $BWEF^{SF}$ and $CIR^{SF}$, respectively, for each flow within the set $I_k$.

In an aspect, in a multi-point to multi-point configuration (MPT-MPT), when a TCA is triggered for all interfaces, then rates in both directions can be reduced. For example, the rate control for the ingress direction can be accomplished for an ingress interface based on the CR manipulation discussed herein, whereby EBW and CIR can be replaced by $BWEF^{SF}_{I,n}$, and $CIR^{SF}_{I,n}$; $n=1,\ldots,N$, and for the egress interface, EBW and CIR can be replaced by $BWEF^{SF}_{E,n}$, and $CIR^{SF}_{E,n}$, for a flow.

Figure 5:
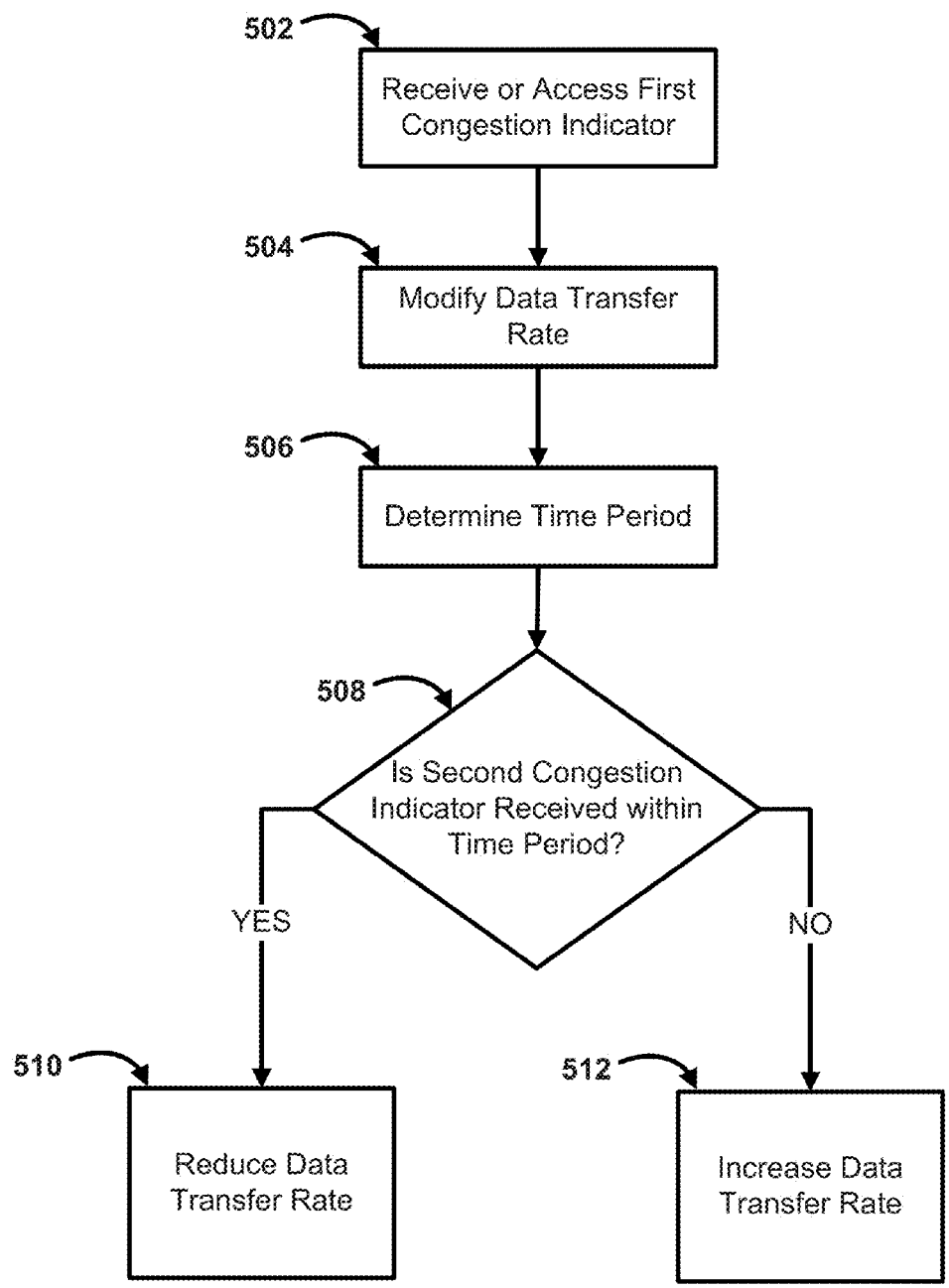
FIG. 5 is a flow chart of an exemplary method.

In an aspect, provided are methods for providing services to a user and/or user device. FIG. 5 illustrates an exemplary method for managing a network. In step 502, a first congestion indicator (e.g., congestion information such as a frame with a service tag) can be received at a first node. In an aspect, the service tag can represent congestion information of at least a portion of the network. As an example, the service tag can comprise discard eligibility data representing the congestion information. In an aspect, the discard eligibility data can represent the congestion information. As an example, the discard eligibility bit having a value of "1"can indicate a congested state of at least a portion of the network. As a further example, the discard eligibility bit having a value of "0"can indicate a non-congested state of at a portion of the network. In an aspect, the first congestion indicator can represent one or more of port level capacity, connection level capacity, and class of service level capacity. In another aspect, the first congestion indicator can be a delay indicator representing one or more of a one-way or round trip point-to-point delay measurement. A point can be a network point that is part of a multipoint-to-multipoint network, a point-to-multipoint, or a point-to-point network. The network point can comprise a user interface, a boundary of a domain of a packet network such as carrier Ethernet network, or a boundary of a domain on a label switched path (LSP) in a multiprotocol label switching (MPLS) network, or a combination thereof. As an example, the delay indicator can comprise a threshold crossing alert or a service tag or both.

In step 504, a data transfer rate (e.g., data rate) can be modified based upon the first congestion indicator. In an aspect, modification of the data transfer rate based upon the first congestion indicator can be optional. In another aspect, modifying a data rate can comprise reducing a data rate based upon a congestion control algorithm or rate adjustment process, as described herein. As an example, modifying a data rate can comprise configuring the transmission data rate of one or more nodes based upon the formulas set forth herein. In another aspect, a data transfer rate can be reduced to an effective bandwidth in response to receiving and/or analyzing the first congestion indicator.

In step 506, a time period can be determined. As an example, the time period can be a factor of a round trip time between a first network point (source) and another network point (destination). As another example, the time period can be a factor of a sliding window time period, such as $n*\Delta t$, where $n=1, 2, \ldots 10$ integer values and $\Delta t$ can be 3.33 msec, 10 msec, 100 msec, 1 sec, 10 sec, 1 min, and 10 min, etc. (e.g., similar to the sliding window of FIG. 4). As a further example, the time period can be determined based on $n*RTT$, where RTT is a round trip time between a source point and a destination point (not necessarily between boundary nodes, since boundary nodes may not be the source and destination for user frames) and where $n=1, 2, \ldots 10$ integer values (e.g., 2 can be a default).

In step 508, it can be determined whether a second congestion indicator is received within the determined time period. In step 510, if a second congestion indicator is received within the time period, the data transfer rate can be reduced to a factor of a committed information rate (CIR). As an example, the factor of a committed information rate is about half the committed information rate. Other factors can be used, such as the formulas described herein.

In step 512, if a second congestion indicator is not received with the time period, the data transfer rate can be increased to a target transfer rate. As an example, the target transfer rate can be greater than the effective bandwidth.

Figure 6:
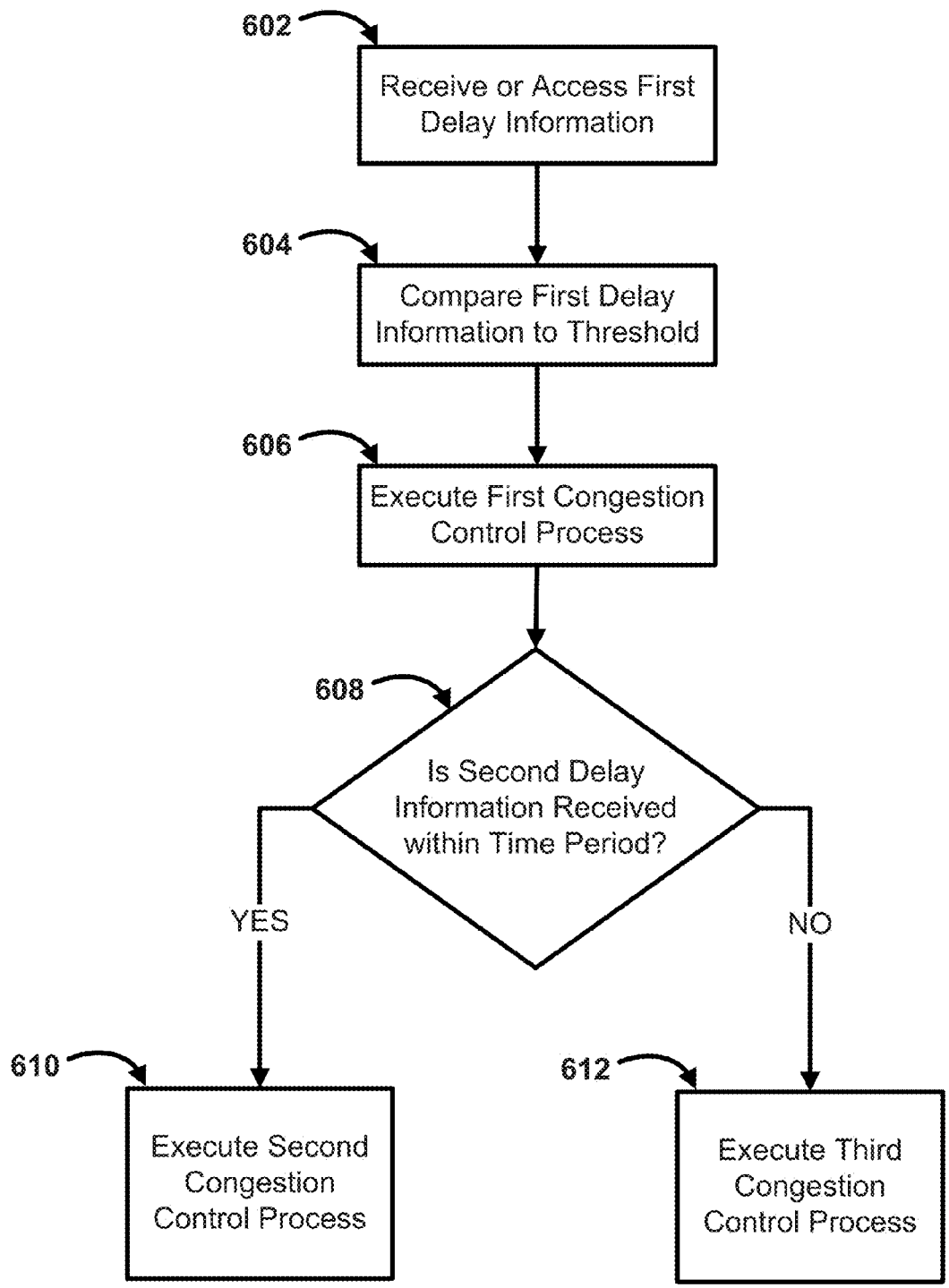
FIG. 6 is a flow chart of an exemplary method.

In an aspect, FIG. 6 illustrates an exemplary method for managing a network. In step 602, delay information can be determined for at least a portion of a network. In an aspect, determining the delay information can comprise receiving a TCA or accessing a delay measurement, such as a one-way delay measurement, a round-trip delay measurement, a point-to-point delay measurement, a point-to-multipoint delay measurement, or a multipoint-to-multipoint delay measuring, or a combination thereof. In another aspect, for a point-to-multipoint configuration, the delay can be determined multiple times, and an indication can be generated and/or transmitted based on one or more of the following processes. As an example, one or more of the following process can be executed based upon processing capacity at a root (e.g., root node, root access device, etc.):

d) Measure the delay from a root to each leaf (one-way (in either direction) or round-trip) and trigger TCA per root-leaf connection;

e) Divide N leaves into K sets of leaves, measure delay and trigger TCA on a per set basis, and apply congestion control mechanism per set. {L1, L2, $L_k$}, where $k=1, 2, \ldots N$; each $L_k$ will have m members, where $m=1, 2, \ldots, S$ where $S \le N$; TCAk is the TCA of $L_k$. The measurement interval can be per second and $TCA_k$ can be issued per one minute, five minute, fifteen minute, or some other time interval; and/or f) Measure the delay between root and randomly selected leaves every second (or other time interval), issue TCA and apply congestion control per point-to-multipoint configuration.

In an aspect, for a multipoint-to-multipoint configuration, the delay can be determined multiple times and an indication can be generated and/or transmitted based on one or more of the following processes. As an example, one or more of the following processes can be executed based upon network load:

g) measure the delay (one-way (in either direction) or round-trip) between interface pairs (e.g., roots, leaf, nodes, access points, etc.) and trigger TCA per interface pair connection, and apply congestion control per interface pair;

h) Divide X number of interfaces into K sets, measure delay and trigger TCA on a per set basis, and apply congestion control mechanism per set basis, $\{I_1, I_2, I_k\}$, where k=1, 2, ..., N; each $I_k$ will have m members, where m=1, 2, ..., S, where S≤N; $TCA_k$ is the TCA of $I_k$. The measurement interval can be per second and $TCA_k$ can be issued per one minute, five minute, fifteen minute, or some other time interval; and/or i) Measure the delay between root and randomly selected interface pair every second (or other time interval), issue TCA and apply congestion control per multipoint-to-multipoint configuration.

In step 604, the first delay information can be compared to a threshold value. In another aspect, a delay can be determined one-way or round trip, depending on the set threshold. For example, in a point-to-point configuration, the delay can be determined at multiple times over a defined interval and TCA can be triggered based on a set of measurements. As a further example, the delay can be determined per second or twice a second or another sampling frequency and averaged over an interval, of one minute, five minutes, fifteen minutes, or some other time interval. As such, if the average determined delay exceeds a threshold, an indicator such as TCA can be generated and/or transmitted.

In step 606, when the delay information exceeds the threshold, a first congestion control process can be implemented. In an aspect, a data rate associated with the service flow can be modified based upon the effective bandwidth determined. In an aspect, modifying the data rate can comprise reducing a data rate based upon a congestion control algorithm. As an example, modifying the data rate can comprise configuring the ingress and/or egress transmission data rate of one or more nodes based upon the formulas set forth herein.

In step 608, it is determined whether the second delay information is received within a threshold time period, and, if so, in step 610 a second congestion control process can be executed. Executing the second congestion control process can comprise reducing one or more of an ingress data rate and an egress data rate based upon a committed information rate (e.g., minimum information rate for account, user, class of service, etc.

In step 612, if the threshold time period passes without receiving the second delay information, a third congestion control process can be executed. Executing the third congestion control process can comprise increasing one or more of an ingress data rate and an egress data rate based upon a congestion control algorithm.

Figure 7:
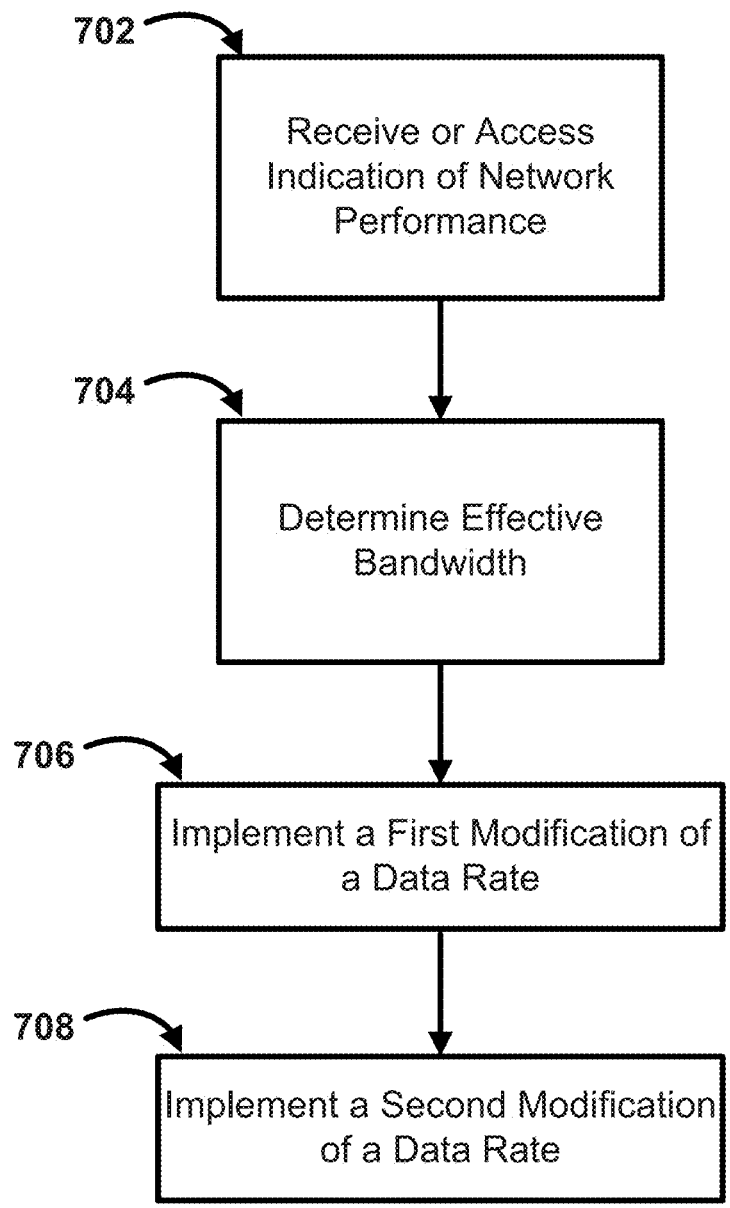
FIG. 7 is a flow chart of an exemplary method.

In an aspect, FIG. 7 illustrates an exemplary method for managing a network. In step 702, an indication of network performance (e.g., delay, congestion, etc.) can be received or accessed. The indication of network performance can represent one or more of congestion, port level delay, connection level delay, and class of service level delay. The indication of network performance represents one or more of a one-way or round trip point-to-point delay measurement. As an example, a TCA can be received. In an aspect, the indication of excessive network delay can relate to a service flow. As an example, a TCA can be provided as an indication of excessive network delay. As another example, a service tag can be provided as the indication of excessive network delay. In an aspect, the service tag can comprise discard eligibility data representing the congestion information. As an example, the discard eligibility data representing the excessive delay information (e.g., congestion) can be a binary bit. As another example, the discard eligibility bit having a value of one can indicate a congested state of at least a portion of the network. As a further example, the discard eligibility bit having a value of zero can indicate a non-congested state of at least a portion of the network. In an aspect, the indication of network delay can represent one or more of port level capacity, connection level capacity, and class of service level capacity.

In step 704, an effective bandwidth can be determined for the service flow. In an aspect, the effective bandwidth can be determined based upon the formulas disclosed herein.

In step 706, a first modification to a data rate associated with the service flow can be implemented. In an aspect, a data rate associated with the service flow can be modified based upon the effective bandwidth determined. In an aspect, modifying the data rate can comprise reducing a data rate based upon a congestion control algorithm. As an example, modifying the data rate can comprise configuring the ingress and/or egress transmission data rate of one or more nodes based on the formulas set forth herein. In another aspect, the data rate can be modified in response to receiving a TCA.

In step 708, a second modification to a data rate associated with the service flow can be implemented. The second modification can be in response to one or more of a passing of a threshold time period and receiving a second indication of network performance. In an aspect, a data rate associated with the service flow can be modified based on the effective bandwidth determined. In an aspect, modifying the data rate can comprise reducing a data rate based upon a congestion control algorithm. As an example, modifying the data rate can comprise configuring the ingress and/or egress transmission data rate of one or more nodes based upon the formulas set forth herein.

The systems and methods of the present disclosure can maximize network utilization by regulating traffic between source and destination automatically, thereby reducing substantial delays and frame/packet drops.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a network device, based on a sliding window delay measurement associated with a service flow, a first indicator of network congestion, wherein the sliding window delay measurement comprises a plurality of delay measurements, wherein at least one delay measurement of the plurality of delay measurements is associated with a randomly selected network point of a plurality of network points;
in response to the receiving the first indicator,
determining, based on a peak rate (PR) value and a maximum burst size (MBS) value associated with a first network point of the plurality of network points, an effective bandwidth for the service flow,
reducing a data transfer rate associated with the service flow to the effective bandwidth, and
determining, based on a factor of a roundtrip time between a source point and a destination point, a time period;
if a second indicator of network congestion is received within the time period, reducing the data transfer rate to a factor of a committed information rate, wherein the second indicator is associated with another sliding window delay measurement; and
if a second indicator of network congestion is not received within the time period, increasing the data transfer rate to a target transfer rate.

2. The method of claim 1, wherein the first network point is associated with a multipoint-to-multipoint network, a point-to-multipoint network, or a point-to-point network.

3. The method of claim 1, wherein the first indicator represents one or more of a one-way point-to-point delay measurement, or a round trip point-to-point delay measurement.

4. The method of claim 1, wherein the first indicator comprises a discard eligible (DE) bit.

5. The method of claim 1, wherein the first network point comprises one of more of a user interface, a boundary of a domain associated with a packet-based network, a boundary of a domain associated with a label switched path (LSP) in a multiprotocol label switching (MPLS) network.

6. The method of claim 1, wherein the target transfer rate is greater than the effective bandwidth.

7. The method of claim 1, wherein, when the service flow is associated with a no loss agreement, the effective bandwidth is based on a delay variation between a pair of packets of the service flow traveling between the first network point and a second network point of the plurality of network points.

8. The method of claim 1, wherein, when the service flow is associated with a loss agreement, the effective bandwidth is based on a frame loss ratio of the service flow traveling between the first network point and a second network point of the plurality of network points.

9. A method comprising:
receiving, by a network device, based on a sliding window delay measurement associated with a service flow, first delay information, wherein the first delay information is associated with a sliding window delay measurement comprises a plurality of delay measurements, wherein at least one delay measurement of the plurality of delay measurements is associated with a randomly selected network point of a plurality of network points;
determining that the first delay information exceeds a threshold;
executing, based on the first delay information exceeding the threshold, a first congestion control process associated with the plurality of network points, wherein executing the first congestion control process comprises,
determining, based on a peak rate (PR) value and a maximum burst size (MBS) value associated with a connection between the plurality of network points, an effective bandwidth for the service flow, and
modifying, based upon the effective bandwidth, one or more of an ingress data rate associated with the service flow, or an egress data rate associated with the service flow;
determining, based on a factor of a roundtrip time between a source point and a destination point, a time period;
if second delay information is received within the time period, executing, based on another sliding window delay measurement associated with the service flow, a second congestion control process associated with the plurality of network points; and
if second delay information is not received within the time period, executing a third congestion control process associated with the plurality of network points.

10. The method of claim 9, wherein the first delay information and the second delay information each represent one or more of a one-way point-to-point delay measurement or a round trip point-to-point delay measurement.

11. The method of claim 9, wherein the first congestion control process, the second congestion control process, and the third congestion control process are different from each other.

12. The method of claim 9, wherein executing the second congestion control process comprises reducing, based upon a committed information rate, one or more of the ingress data rate or the egress data rate.

13. The method of claim 9, wherein executing the third congestion control process comprises increasing, based upon a congestion control algorithm, one or more of the ingress data rate or the egress data rate.

14. The method of claim 9, wherein, when the service flow is associated with a no loss agreement, the effective bandwidth is based on a delay variation traveling between a pair of packets of the service flow between the plurality of network points.

15. A method comprising:
receiving, by a network device, based on a sliding window delay measurement associated with a service flow, a first indication of network performance, wherein the sliding window delay measurement comprises a plurality of delay measurements, wherein at least one delay measurement of the plurality of delay measurements is associated with a randomly selected network point of a plurality of network points;
determining, based on a peak rate (PR) value and a maximum burst size (MBS) value, an effective bandwidth for the service flow;
causing, based on the effective bandwidth, a first modification of one or more of an ingress data rate associated with the service flow or an egress data rate associated with the service flow;
determining, based on a factor of a roundtrip time between a source point and a destination point, a time period; and
causing, in response to one or more of an expiration of the time period or receiving a second indication of network performance, a second modification, based on the effective bandwidth, of one or more of the ingress data rate or the egress data rate.

16. The method of claim 15, wherein the first indication and the second indication each represent one or more of congestion, port level delay, connection level delay, or class of service level delay, wherein the second indication is based on another sliding window delay measurement.

17. The method of claim 15, wherein the first indication and the second indication each represent one or more of a one-way point-to-point delay measurement or a round trip point-to-point delay measurement.

18. The method of claim 15, wherein causing one or more of the first modification or the second modification of one or more of the ingress data rate or the egress data rate comprises reducing, based upon a congestion control algorithm, one or more of the ingress data rate or the egress data rate.

* * * * *